April 13, 1948.　　V. A. P. SARACCHI　　2,439,636
STEERING HANDLE
Filed June 29, 1945
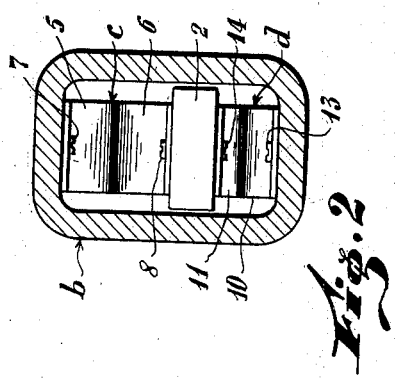
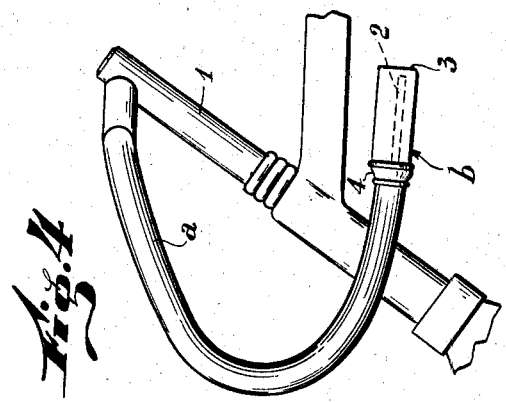
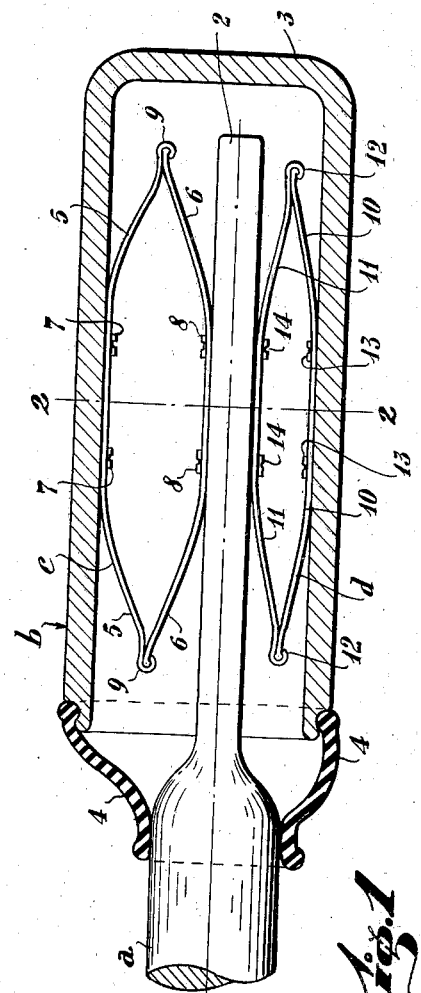
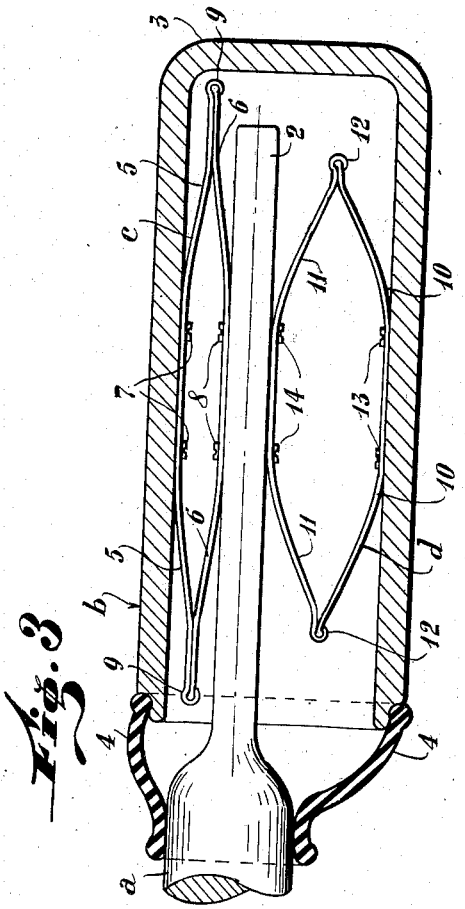
INVENTOR,
Vicente Alberto Pedro Saracchi
BY
ATTORNEY Patented Apr. 13, 1948

2,439,636

UNITED STATES PATENT OFFICE 2,439,636

STEERING HANDLE

Vicente Alberto Pedro Saracchi, Buenos Aires, Argentina

Application June 29, 1945, Serial No. 602,338
In Argentina May 28, 1945

4 Claims. (Cl. 74—551.9)

This invention relates to a steering handle for bicycles, motorcycles and other vehicles, and has for its object the simplification of the front-wheel shock absorbing system by utilizing means which, in their elastic function, might well acquire an importance similar to that of the tire.

As known, all shock absorbing systems, except the tires, are constituted of elastic elements mounted as intermediary members at different points of the frame located between the wheel and the steering handle. Hence, the frame of the vehicle has to be divided in two sections which, being coupled by means of the aforementioned resilient or elastic member, require the use of sliding assemblies or other mountings which, although considerably increasing the manufacturing cost of the vehicle, do not eliminate frictional losses and other effects which tend to counteract the shock absorbing action of the elastic suspension.

The drawbacks referred to have limited the application of shock absorbers to the extreme that they were used only in high-priced machines such as motorcycles and similar vehicles, since in spite of the advantages offered by the application of shock absorbers to bicycles, their utilization would imply extraordinary structural complications and hence would result in prohibitive prices.

Taking into account the complicated construction of the intermediary resilient elements, experiments have been carried out with means which neutralize the trepidations of the vehicle directly at the handle or handles of the steering bar, and these experiments have served as a basis for the present invention according to which the rigid mounting of the handles on the steering bar is subsituted by a floating or resilient coupling so that the hands of the driver, although firmly controlling the direction of the vehicle, are made independent of the front wheel assembly of the vehicle.

The invention is concerned with replacing the fixed grip of the handle-bars by a floating grip provided with springs in such a manner that the base on which the driver's hand rests is made independent of the front frame of the vehicle, both in the sense of a rest for the arms, and in that relating to the opposite reaction to said support.

To this end the grip has inside it two double ogive springs by means of which it is fitted to the end of the arm of the handle-bars, so that while one of the springs acts as a resilient support for the upper portion, the other spring acts as a damper for reaction effects.

For greater clarity and better understanding of the object of this invention, it has been illustrated by several figures in which the handle-bars described are shown in a preferred embodiment, all by way of example, and Fig. 1 is a longitudinal section of the grip of the handle-bars, showing the inoperative arrangement of the springs.

Fig. 2 is a transverse section taken along the line 2—2 of Fig. 1.

Fig. 3 a sectional view illustrating the displacement of the shock absorbing handle according to Fig. 1 with respect to the steering bar.

Fig. 4 a side elevation of the upper portion of the front wheel assembly of a bicycle, motorcycle or similar vehicle equipped with a shock-absorbing handle according to the invention.

In the drawings, wherein similar elements or parts have been designated with the same reference numerals or characters, $a$ is the steering handle of a bicycle, motorcycle or similar vehicle which, as known, is formed of a pair of handlebars each provided with a handle so that the driver may conveniently hold the steering handle and thus easily control the direction of the vehicle.

Steering handle $a$ is fixed to front fork $l$ which, when provided with shock-absorbing means, is usually formed of two sections mechanically related by means of sliding members having interposed the resilient or spring members.

In the case of the present invention, fork $l$ corresponding to the front wheel of the vehicle, is constituted by an integral frame provided with a steering bar $a$ but nevertheless comprises shock-absorbing means which, instead of being arranged at intermediate points of the frame, are located at the extremes of the handlebars of the steering bar and are constituted by the handles $b$ which are floatingly mounted and resiliently insulated from the steering bar by means of elastic members.

In order that each handle $b$ may conveniently oscillate with respect to the corresponding handlebar, each handlebar of steering bar $a$ terminates in an extension 2 having a section smaller than that of the other portions of the handlebar. Handle $b$ is formed of a tubular body of substantially rectangular cross-section having rounded-off edges to provide a comfortable grip for the driver's hand. The interior cavity of handle $b$ is designed with a width corresponding to that of extension 2 of the handlebar, so that the latter acts as a guide during the vertical movements of shock-absorbing handle $b$.

One of the ends of the handle is provided with a terminal plate 3 constituting the closure member of the steering bar assembly, while the other extreme of the handle carries a sleeve 4 of rubber or other resilient material fitted around the handlebar of the steering bar to effectively close the handle assembly but which allows a free displacement of handle $b$ with respect to the handlebar of the steering assembly or vice versa.

The handle $b$ is fixed to and supported by extension 2 through resilient coupling means $c$ which, are constituted by spring members 5 and 6, the former of which comprising two similar elliptic springs, are fixed to the upper portion of the handle by means of rivets 7, while the latter, also comprising two similar springs, are fixed to extension 2 by means of rivets 8; the ends of springs 5 are connected to the respective ends of springs 6 by means of rolling joints 9 which allow of free movement of both springs which thus form a double elliptic structure. Since the springs, connected at their extremes, form a double bearing member, they support handle b allowing of an elastic displacement of the latter but offer a resistance such that the resilient coupling member c can sustain the weight of the person which, holding handles b controls the direction of the vehicle.

To prevent handle b striking against extension 2, a resilient coupling means d is interposed, formed also of two springs 10 and 11 of smaller dimensions than those of resilient coupling means c, but also constituting a double elliptic suspension, the ends of both springs being joined by means of rolling joints 12. Spring 10, by means of rivets 13, is fixed to handle b, and spring 11, by means of rivets 14, is fixed to extension 2.

In this way, handle b is insulated from extension 2 both above and below; the movements and vibrations which the vehicle communicates to the fork and steering handle a, are not transmitted directly to handle b, as they are absorbed by resilient coupling means c and d.

As is common in spring suspensions, certain effects which reflect on the body of the driver, produce an overload which overcomes the resistance of the resilient coupling means c, whose reaction tends to provoke an oscillation, but as resilient coupling means d opposes this oscillation, it ceases at once and the required stability is maintained.

Due to the fact that springs 5, 6, 10 and 11 are sufficiently strong and are connected together, handle b does not require any other means of coupling with extension 2 of the handlebars a than those provided by resilient coupling means c and d.

Since the handle b is adapted to extension 2 of handlebar a by means of resilient coupling means, the relative movements of said extension and handle being absorbed by said spring members, in such a way that the vibration of fork 1 and handlebar a are not transmitted directly to handle b.

While I have indicated and described a specific embodiment for carrying my invention into effect, it will be apparent to one skilled in the art that my invention is by no means limited to the particular organization shown and described, but that many modifications may be made without departing from the scope of my invention as set forth in the appended claims.

I claim:

1. In a steering handle bar construction for bicycles, motor cycles and the like, a grip of tubular formation fitted about an end of the handle bar, said grip having a tubular cross-section with a hollow portion several times that of the cross-section of the end of the handle bar to which it is fitted, and connecting means for the end of the handle bar and said grip comprising a first spring between the upper surface of the handle bar end and the grip composed of two arc-like members which are substantially elliptically shaped and which when connected together by their respective ends form a double ogive, and a second spring between the lower portion of the end of the handle bar and the grip composed of two arc-like members which are substantially elliptically shaped and which when connected together by their respective terminals form a double ogive.

2. The steering handle bar construction of claim 1 wherein the mean portion of one of the arcs of each spring is connected to the internal face of the grip and the mean portion of the other arc of each spring is connected to the end of the handle bar.

3. In a steering handle bar construction for bicycles, motor cycles and the like, a handle bar having an end of a flattened tongue-shape, a grip of tubular formation fitted about an end of the handle bar, said grip having tubular cross-section with a hollow portion several times that of the cross-section of the tongue-shaped end to which it is fitted, and connecting means for the end of the handle bar and said grip comprising a first spring connected to the upper surface of the tongue and the grip composed of two arc-like members which are substantially elliptically shaped and which when connected together by their respective ends form a double ogive, and a second spring between the lower portion of the tongue and the grip composed of two arc-like members which are substantially elliptically shaped and which when connected together by their respective terminals form a double ogive.

4. In a steering handle bar construction for bicycles, motor cycles and the like, a handle bar having an end of general circular cross-section terminating in a relatively flat tongue portion, a grip including a closed cap about the tongue shaped portion and a resilient sleeve about the round portion of the handle bar, and connecting means for the end of the handle bar and said grip comprising a first spring between the upper surface of the tongue-shaped portion and the grip composed of two arc-like members which are substantially elliptically shaped, and which when connected together by their respective ends form a double ogive, and a second spring between the lower surface of the tongue-shaped portion and the grip similarly composed of two arc-like members which are substantially elliptically shaped and which when connected together by their respective terminals form a double ogive.

VICENTE ALBERTO PEDRO SARACCHI.

REFERENCES CITED

The following references are of record in the file of this patent:

UNITED STATES PATENTS

| Number | Name | Date |
| --- | --- | --- |
| 421,277 | Horton et al. | Feb. 11, 1890 |
| 592,634 | Lampert | Oct. 26, 1897 |
| 630,649 | Briggs | Aug. 8, 1899 |
| 631,645 | Kleinsteuber | Aug. 22, 1899 |
| 880,297 | Graham-Yooll | Feb. 25, 1908 |
| 2,101,765 | Tenney | Dec. 7, 1937 |

FOREIGN PATENTS

| Number | Country | Date |
| --- | --- | --- |
| 174,526 | Germany | Sept. 21, 1906 |